US012594771B2

(12) United States Patent
Koyama

(10) Patent No.: US 12,594,771 B2
(45) Date of Patent: Apr. 7, 2026

(54) IMAGE RECORDING DEVICE INCLUDING THERMAL HEAD AND READER POSITIONED DOWNSTREAM OF THERMAL HEAD IN CONVEYING DIRECTION

(71) Applicant: BROTHER KOGYO KABUSHIKI KAISHA, Nagoya (JP)

(72) Inventor: Keita Koyama, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 131 days.

(21) Appl. No.: 18/062,291

(22) Filed: Dec. 6, 2022

(65) Prior Publication Data

US 2023/0202196 A1 Jun. 29, 2023

(30) Foreign Application Priority Data

Dec. 27, 2021 (JP) ................................ 2021-212808

(51) Int. Cl.
*B41J 2/325* (2006.01)

(52) U.S. Cl.
CPC .................................... *B41J 2/325* (2013.01)

(58) Field of Classification Search
CPC ....................................................... B41J 2/325
See application file for complete search history.

(56) References Cited

U.S. PATENT DOCUMENTS 5,657,066 A 8/1997 Adams et al.
5,923,357 A * 7/1999 Sugimoto ................ B41J 2/325 347/171
2013/0215210 A1* 8/2013 McNestry ................ B41J 33/36 347/214
2015/0356717 A1 12/2015 Madden et al.
2020/0207565 A1 7/2020 Koyama et al.
2020/0401774 A1* 12/2020 Ackley .................... G06K 7/14
(Continued)

FOREIGN PATENT DOCUMENTS

JP H02-136983 A 5/1990
JP H06-336041 A 12/1994
JP 2000-127564 A 5/2000
(Continued)

OTHER PUBLICATIONS

English translation of JP 2007007963 A (Year: 2007).*

*Primary Examiner* — Shelby L Fidler
*Assistant Examiner* — Tracey M Mcmillion
(74) *Attorney, Agent, or Firm* — Kenealy Vaidya LLP

(57) ABSTRACT

In an image recording device, a thermal head is located in the housing. An ink ribbon is to be supplied toward the thermal head from a first supply member. A first supply member is located in the housing. A first take-up member is located in the housing and takes up the ink ribbon. A conveying member is located in the housing and conveys a medium toward the thermal head. A platen is located in the housing and faces the thermal head. The platen and the thermal head sandwich both the ink ribbon and the medium at a nip position in a first direction in which the ink ribbon is conveyed. A first reader is located in the housing and optically reads a first target portion of the ink ribbon which is positioned at a first reading position downstream of the nip position in the first direction.

9 Claims, 10 Drawing Sheets

(56) References Cited

U.S. PATENT DOCUMENTS

| | | | |
|---|---|---|---|
| 2021/0218857 | A1 | 7/2021 | D'Armancourt et al. |
| 2024/0123743 | A1 | 4/2024 | Buthrath et al. |

FOREIGN PATENT DOCUMENTS

| | | | | | |
|---|---|---|---|---|---|
| JP | 2006056054 | A | * | 3/2006 | |
| JP | 2007007963 | A | * | 1/2007 | |
| JP | 2008272971 | A | * | 11/2008 | |
| JP | 2016-74181 | A | | 5/2016 | |
| JP | 2016107587 | A | * | 6/2016 | |
| JP | 2017185702 | A | * | 10/2017 | .............. B41J 11/42 |
| JP | 2020-106504 | A | | 7/2020 | |
| JP | 2020-108925 | A | | 7/2020 | |
| JP | 2020-157522 | A | | 10/2020 | |
| JP | 2021-81259 | A | | 5/2021 | |
| WO | 2021186561 | A1 | | 9/2021 | |

* cited by examiner

IMAGE RECORDING DEVICE INCLUDING THERMAL HEAD AND READER POSITIONED DOWNSTREAM OF THERMAL HEAD IN CONVEYING DIRECTION

REFERENCE TO RELATED APPLICATIONS

This application claims priority from Japanese Patent Application No. 2021-212808 filed on Dec. 27, 2021. The entire content of the priority application is incorporated herein by reference.

BACKGROUND ART

In a conventional thermal transfer printer, labels are conveyed from a media hanger to a printhead assembly, and an ink ribbon is conveyed from a ribbon supply spindle to the printhead assembly. The printhead assembly in this printer has a printhead that, under control of a controller, generates heat based on image data. The generated heat transfers ink from the ink ribbon to form an image on a label. When the printer is set to a tear-off mode, the label having an image recorded thereon (i.e., the printed matter) is discharged through an opening formed in the housing of the printer. When the printer is set to a rewind mode, the printed matter is rewound by a rewind spindle mounted inside the housing.

DESCRIPTION

There is demand for adding an image inspection device to conventional thermal transfer printers. An image inspection device functions to evaluate images on printed matter. The image inspection device includes a reader and a controller. The reader is a contact image sensor (CIS) or the like that optically reads images on printed matter and outputs data representing the reading results. The controller inspects the image based on the data outputted from the reader.

Generally, the printhead of a thermal transfer printer is positioned inside the housing near the opening through which the printed matter is discharged. Therefore, when an image inspection device is added to the printer, the reader of this device is mounted outside the housing near the discharge opening. However, mounting the reader on the outside of the housing increases the overall size of the printer.

In view of the foregoing, it is an object of the present disclosure to provide a thermal transfer image recording device and image evaluation method capable of suppressing an increase in the device size due to the addition of a reader used for image evaluation.

In order to attain the above and other object, according to one aspect, the present disclosure provides an image recording device. The image recording device includes a housing, a thermal head, a first supply member, a first take-up member, a conveying member, and a platen. The thermal head is located in the housing. From the first supply member an ink ribbon is to be supplied toward the thermal head. The first supply member is located in the housing. The ink ribbon including an ink layer. The first take-up member is located in the housing and configured to take up the ink ribbon. The conveying member is located in the housing and configured to convey a medium toward the thermal head. The platen is located in the housing and faces the thermal head. The platen and the thermal head are configured to sandwich both the ink ribbon and the medium at a nip position in a first direction in which the ink ribbon is conveyed. The first reader is located in the housing and configured to optically read a first target portion of the ink ribbon which is positioned at a first reading position downstream of the nip position in the first direction.

With the above structure, the thermal head transfers ink of the first target portion of the ink ribbon to the label. Consequently, the first target portion of the ink ribbon having passed through the nip position has a reverse image formed in the same shape as the image that was recorded on the label. The first reader reads the reverse image on the first target portion of the ink ribbon. By evaluating the condition of the reverse image formed on the ink ribbon with the first reader, the recording device can determine the quality of label. Since the first reader is mounted inside the housing, this arrangement avoids an increase in the size of the image recording device.

According to another aspect, a method. The method includes: transferring, using a thermal head, ink to selected areas on a medium from an ink layer provided in an ink ribbon to record an image on the medium; generating first reading data by optically reading a used portion of the ink ribbon by using a reader, the used portion being a portion that has been used to form the transferring; and evaluating a condition of the image recorded on the medium by using the first reading data.

With the above structure, by evaluating the condition of the image formed on the ink ribbon with the first reader, the method can determine the quality of label without requiring a reader that reads the medium on which an image is formed.

Figure 1A:
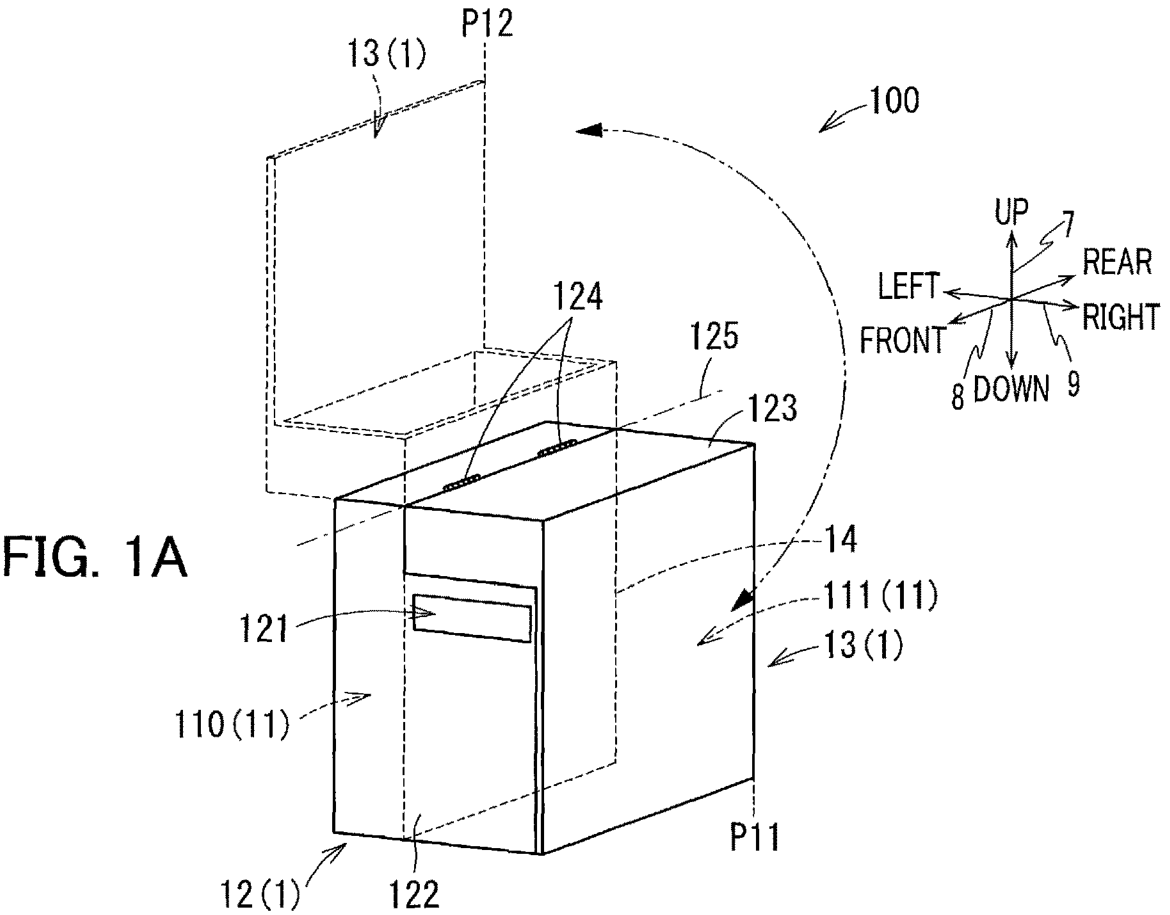
FIG. 1A is a perspective view illustrating an external appearance of a printer.

Below, a printer 100 (an example of the image recording device) according to an embodiment of the present disclosure will be described. The embodiment described below is merely one example of the present disclosure, and it would be apparent to those skilled in the art that the embodiment may be modified as appropriate without departing from the spirit of the disclosure.

In this embodiment, advancement from a start point to an end point of an arrow will be expressed as "a direction," while the advancement in both opposing directions along a line connecting the start point to the end point of an arrow will be expressed as "directions." Thus, up/down directions 7 in the following description are defined based on the orientation of the printer 100 when the printer 100 is disposed in its operable state (the state shown in FIG. 1A); front/rear directions 8 are defined so that the side of the printer 100 in which a discharge opening 121 is formed constitutes the front side; and left/right directions 9 are defined based on the perspective of an observer facing the front side of the printer 100.

Housing 1 of the Printer 100

As shown in FIG. 1A, the printer 100 has a housing 1 that has a general rectangular parallelepiped shape. The housing 1 separates an interior space 11 of the printer 100 from the exterior. The housing 1 includes a case 12, and a cover 13. The case 12 includes a front wall 122, and a top wall 123. A discharge opening 121 is formed in the front wall 122 of the case 12. The discharge opening 121 is a through-hole having a rectangular shape that is elongated in the left/right directions 9. Hinges 124 are attached to the top wall 123 of the case 12 for connecting the cover 13 to the case 12. The hinges 124 have a rotational axis 125 aligned in the front/rear directions 8. The cover 13 rotates about the rotational axis 125 between a closed position P11 and an open position P12. The cover 13 closes the right side of the case 12 in the closed position P11 and exposes the right side of the case 12 in the open position P12.

Internal Structure of the Printer 100

Figure 1B:
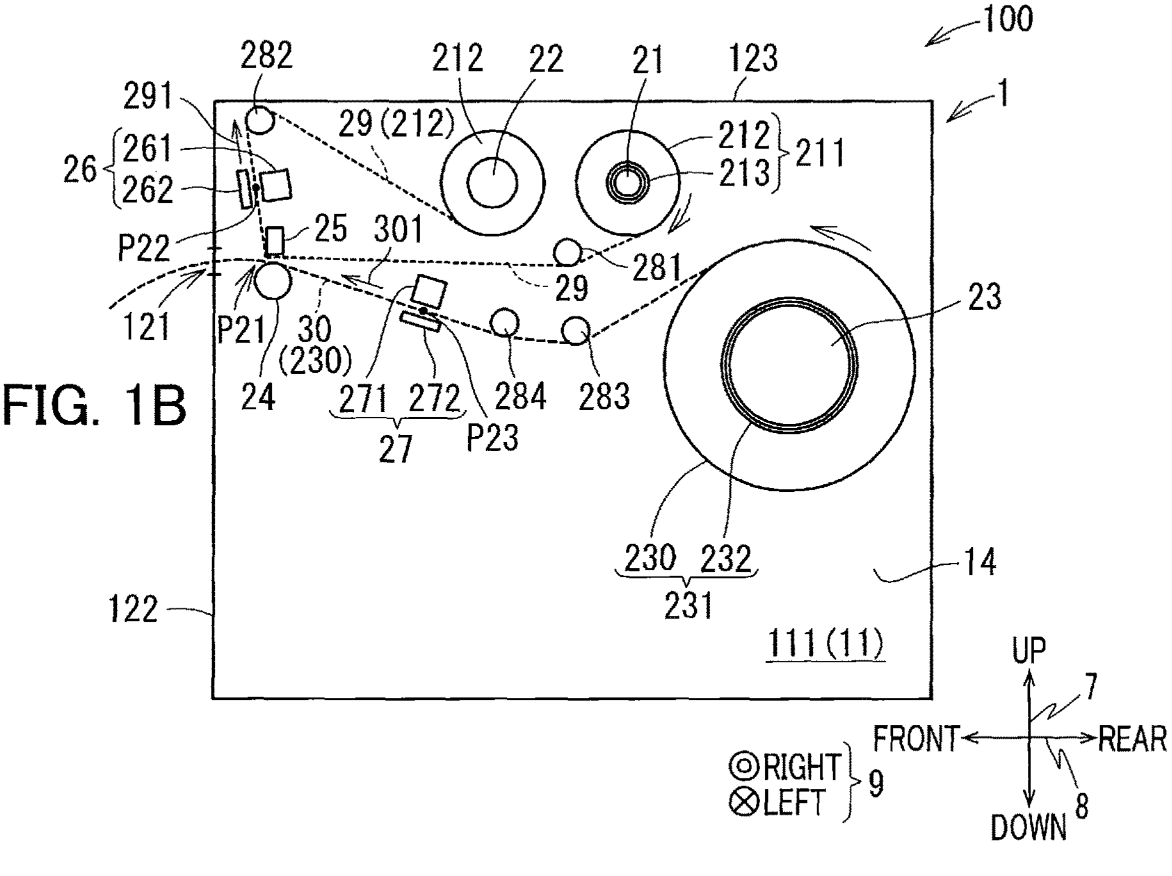
FIG. 1B is a schematic diagram illustrating interior structures of the printer.

As shown in FIG. 1A, the printer 100 has a partitioning wall 14 that partitions the interior space 11 into a right space 111, and a left space 110. As shown in FIG. 1B, the printer 100 is provided with a ribbon supply member 21, a ribbon take-up member 22, a media supply member 23, a platen roller 24, a thermal head 25, a ribbon reader 26, and a media reader 27 as the main components in the right space 111. The user can access these main components when the cover 13 is in the open position P12 (see FIG. 1A).

Ribbon Supply Member 21, Ribbon Take-Up Member 22, and Media Supply Member 23

The ribbon supply member 21, the ribbon take-up member 22, and the media supply member 23 are all spindles. Each of the spindles extends in the left/right directions 9 and is supported in the partitioning wall 14 so as to be rotatable about a rotational axis aligned in the left/right directions 9.

Ribbon Supply Member 21 and Ribbon Roll 211

The ribbon supply member 21 is disposed in the approximate center of the right space 111 in relation to the front/rear directions 8 and is positioned near the top of the right space 111 relative to the up/down directions 7. The ribbon supply member 21 rotatably supports a ribbon roll 211. The ribbon supply member 21 is an example of the first supply member.

Figure 2A:
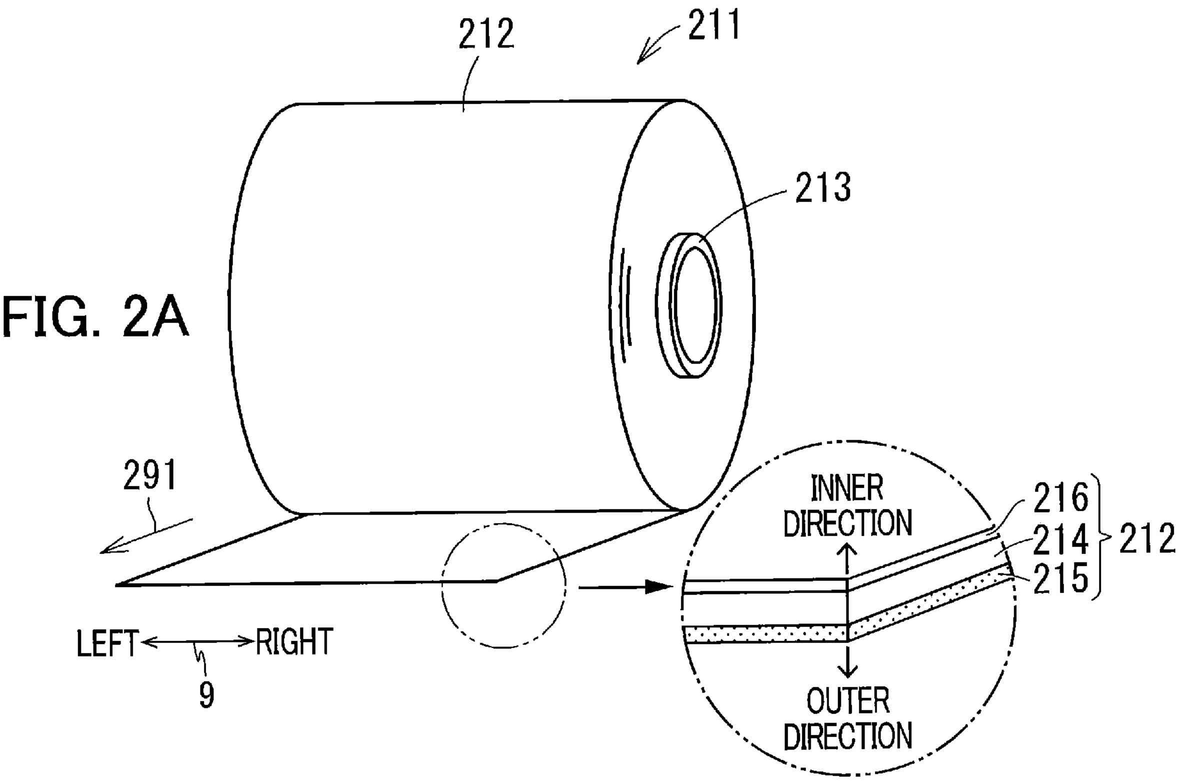
FIG. 2A is a perspective view illustrating a ribbon roll.

As shown in FIG. 2A, the ribbon roll 211 includes a core tube 213, and an ink ribbon 212 wrapped around the outer circumferential surface of the core tube 213. The ink ribbon 212 has a base layer 214 (an example of the base material), an ink layer 215, and a back coat layer 216. The left-right width of the ink ribbon 212 is predetermined. The base layer 214 is a long continuous film made of a translucent material such as polyethylene terephthalate (PET). The ink layer 215 is a hot-melt ink formed on the outer main surface of the base layer 214. The ink contains a black colorant, and a wax that is solid at room temperature but melts at a high temperature. As an alternative, the ink may contain a semi-resin or resin in place of the wax. The back coat layer 216 comprising a translucent material such as an acrylic or silicone resin is formed on the inner main surface of the base layer 214.

The position of the ink ribbon 212 in the left/right directions 9 is set when the core tube 213 is mounted over the ribbon supply member 21, as shown in FIG. 1B. In this embodiment, the position of the left edge of the ink ribbon 212 serves as a "reference position" in the printer 100. Further, when mounted on the ribbon supply member 21, the ribbon roll 211 can rotate clockwise in a right side view. The ink ribbon 212 is drawn off the ribbon roll 211 in a direction diagonally downward and forward from a position near the bottom of the ribbon roll 211. Hereinafter, the term "ribbon roll 211" will signify the "ribbon roll 211 mounted on the ribbon supply member 21" unless otherwise specified.

Ribbon Take-Up Member 22

The ribbon take-up member 22 (an example of the first take-up member) is positioned forward of the ribbon supply member 21 in the right space 111. The ribbon take-up member 22 takes up used ink ribbon 212.

Media Supply Member 23 and Media Roll 231

The media supply member 23 (an example of the conveying member) is positioned diagonally downward and rearward from the ribbon supply member 21 in the right space 111. The media supply member 23 rotatably supports a media roll 231 (an example of the medium).

Figure 2B:
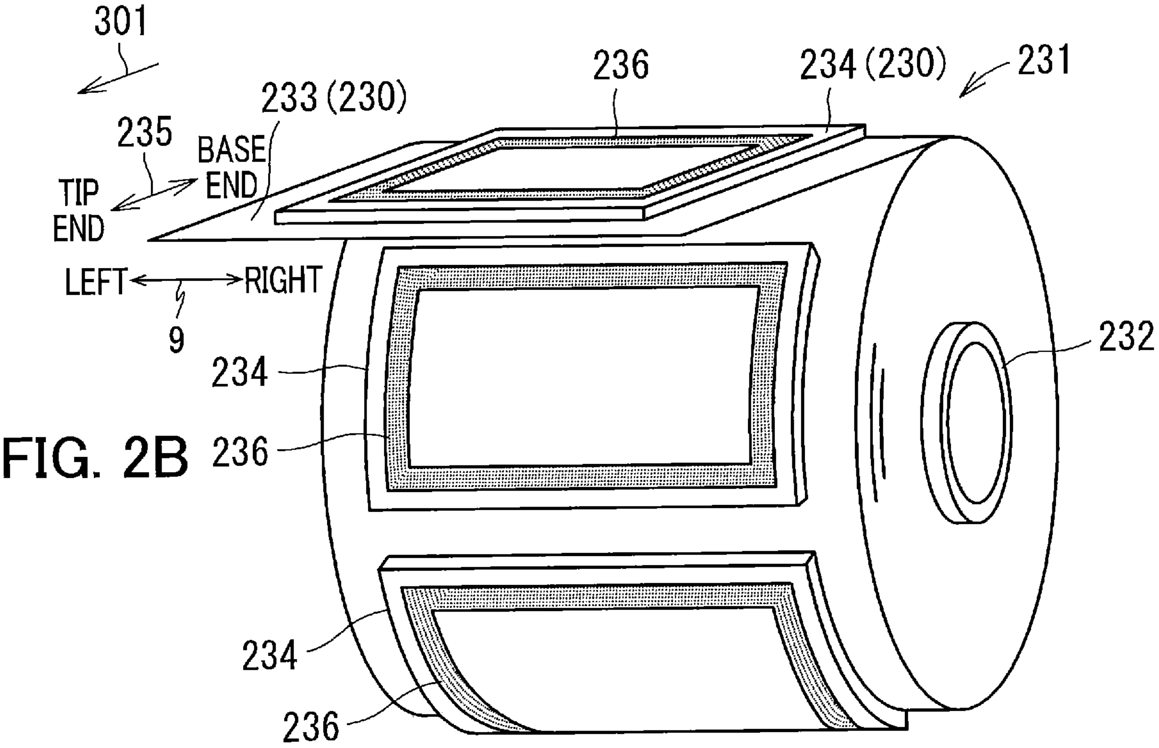
FIG. 2B is a perspective view illustrating a media roll.

As shown in FIG. 2B, the media roll 231 is a roll of die-cut labels. The media roll 231 is provided with a medium 230, and a core tube 232. The medium 230 has backing paper 233 (an example of the base material), and a plurality of labels 234. The medium 230 is a continuous strip of paper made of a translucent material and is wound around the core tube 232. The left-right width of the medium 230 is narrower than the left-right width of the ink ribbon 212. The labels 234 (an example of the target material) are temporarily affixed to the outer main surface of the backing paper 233 so as to be aligned in a longitudinal direction 235 of the backing paper 233. Each label 234 has a white-colored printing surface and the same general rectangular shape. A rectangular border (frame) 236 is prerecorded in black on the printing surface of each label 234. Each rectangular border 236 (an example of the second image) has the same shape and is recorded in the same position on the outer main surface of the respective label 234.

As shown in FIG. 1B, the core tube 232 is mounted over the media supply member 23. With this arrangement, the position of the left edge of the backing paper 233 is aligned with the reference position. The core tube 232 can rotate counterclockwise in a right side view. The backing paper 233 is drawn off the media roll 231 in a direction diagonally downward and forward from a position near the top of the media roll 231.

Platen Roller 24

The platen roller 24 (an example of the platen) extends in the left/right directions 9 inside the right space 111 and is supported by the partitioning wall 14 so as to be rotatable about an axis aligned in the left/right directions 9. The platen roller 24 is positioned directly rearward of the discharge opening 121 and further forward than the ribbon take-up member 22 relative to the front/rear directions 8. The platen roller 24 is also positioned lower than the ribbon supply member 21 relative to the up/down directions 7.

Thermal Head 25

The thermal head 25 is supported in the partitioning wall 14 at a position directly above the platen roller 24. The thermal head 25 has a plurality of heating elements. The heating elements are juxtaposed within a range corresponding to the left-right width of the ribbon roll 211 that begins from the reference position (hereinafter called the "recordable range"). The heating elements face the outer circumferential surface of the platen roller 24 from above to form a nip therewith. Hereinafter, the area in which the heating elements faces (confronts) the platen roller 24 will be called the "printing area (nip area) P21."

Ribbon Conveying Path 29 and Media Conveying Path 30

The ink ribbon 212 paid off the ribbon roll 211 is first wrapped around the bottom of a guide roller 281. From the guide roller 281, the ink ribbon 212 extends forward until passing through the printing area P21 in which the ink ribbon 212 is sandwiched between the thermal head 25 and the platen roller 24. From the printing area P21, the ink ribbon 212 extends straight toward a guide roller 282 disposed above the ribbon reader 26. The ink ribbon 212 is wrapped around the front and top of the guide roller 282, and then extends toward the ribbon take-up member 22 to be taken up thereby.

The medium 230 paid off the media roll 231 is first wrapped around the bottoms of guide rollers 283 and 284. From the guide roller 284, the medium 230 extends straight toward the printing area P21 in which the medium 230 is sandwiched between the thermal head 25 and the platen roller 24 and passes beneath the ink ribbon 212. After passing through the printing area P21, the medium 230 is discharged through the discharge opening 121.

In the following description, the spaces through which the ink ribbon 212 and the medium 230 pass will be called a ribbon conveying path 29 and a media conveying path 30, respectively. The direction from the printing area P21 to the guide roller 282 will be called a ribbon conveying direction 291 (an example of the first conveying direction). The ribbon conveying path 29 (an example of the first conveying path) and the media conveying path (an example of the second conveying path) 30 both pass through the recordable range relative to the left/right directions 9. The ribbon conveying path 29 has a predetermined ribbon reading area P22 (an example of the first reading position) positioned directly downstream of the printing area P21. Further, the direction from the guide roller 284 toward the printing area P21 will be called a media conveying direction 301 (an example of the second direction). A media reading area P23 (an example of the second reading position) is provided on the media conveying path 30 between the guide roller 284 and the printing area P21. The ribbon reading area P22 and the media reading area P23 are both linear areas extending in the left/right directions 9.

Ribbon Reader 26

As shown in FIG. 1B, the ribbon reader 26 (an example of the first reader) has a contact image sensor (CIS) 261, and a reflecting member 262. The CIS 261 and the reflecting member 262 are supported by the partitioning wall 14 in the right space 111 and extend in the left/right directions 9. The CIS 261 is positioned directly rearward from the ribbon reading area P22. The reflecting member 262 is positioned directly forward from the ribbon reading area P22 and faces (confronts) the CIS 261 with a slight gap formed therebetween. At the position of the ink ribbon 212 passing through this gap, the back coat layer 216 (see FIG. 2A) faces the CIS 261. Accordingly, ink on the ink ribbon 212 is unlikely to be deposited on the CIS 261.

Figure 3A:
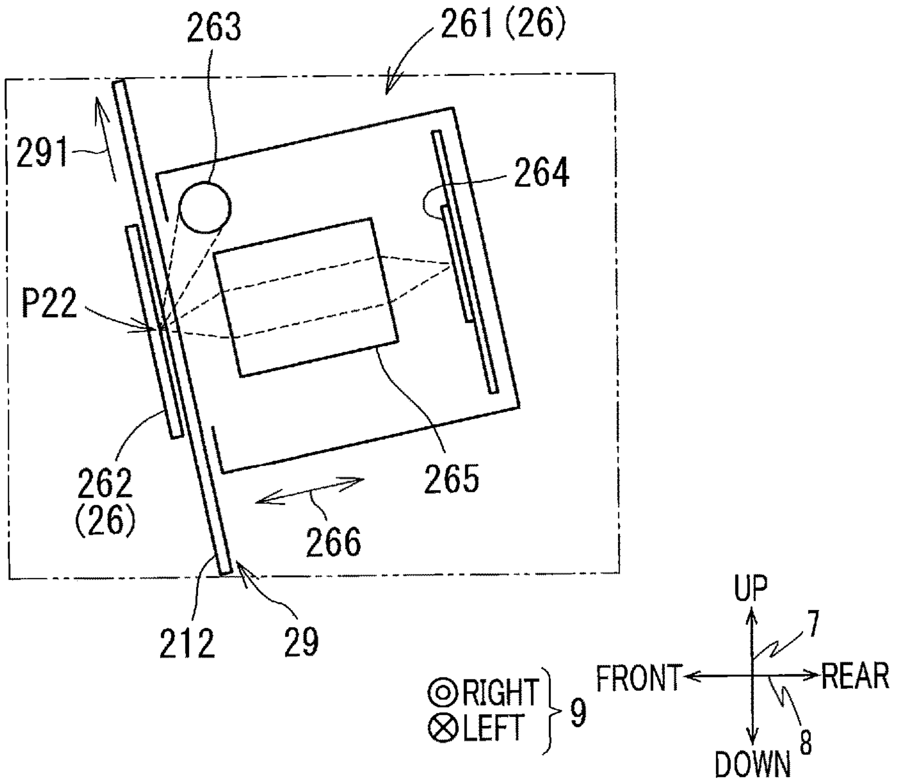
FIG. 3A is a schematic diagram illustrating a ribbon reader.

As shown in FIG. 3A, the CIS 261 is primarily configured of a plurality of light-emitting diodes (LEDs) 263, a plurality of photodiodes 264, and a plurality of rod lenses 265. Each of these pluralities of components are aligned in the left/right directions 9 within the recordable range. The optical axis of each LED 263 passes through the ribbon reading area P22. The photodiodes 264 are positioned apart from the ribbon reading area P22 in a separating direction 266. When viewed in the left/right directions 9, the separating direction 266 is the direction of the normal to the ribbon conveying path 29 at the ribbon reading area P22. The rod lenses 265 are gradient-index lenses. The rod lenses 265 are positioned between the ribbon reading area P22 and the photodiodes 264. The optical axis for each of the photodiodes 264 and the rod lenses 265 is aligned with the separating direction 266.

The main surface of the reflecting member 262 is white in color. This main surface has a narrow rectangular shape. The reflecting member 262 is disposed directly in front of the ribbon reading area P22 and extends along the ribbon reading area P22 in the left/right directions 9.

Media Reader 27

As shown in FIG. 1B, the media reader 27 (an example of the second reader) has a CIS 271, and a reference member 272. The CIS 271 and the reference member 272 are supported on the partitioning wall 14 in the right space 111 and extend in the left/right directions 9. The CIS 271 is positioned directly above the media reading area P23 and is below and separated from the ink ribbon 212 on the ribbon conveying path 29. The reference member 272 is positioned directly below the media reading area P23 and faces (confronts) the CIS 271 with a small gap formed therebetween. The main surface of the reference member 272 is white in color and functions as a white reference plate.

Figure 3B:
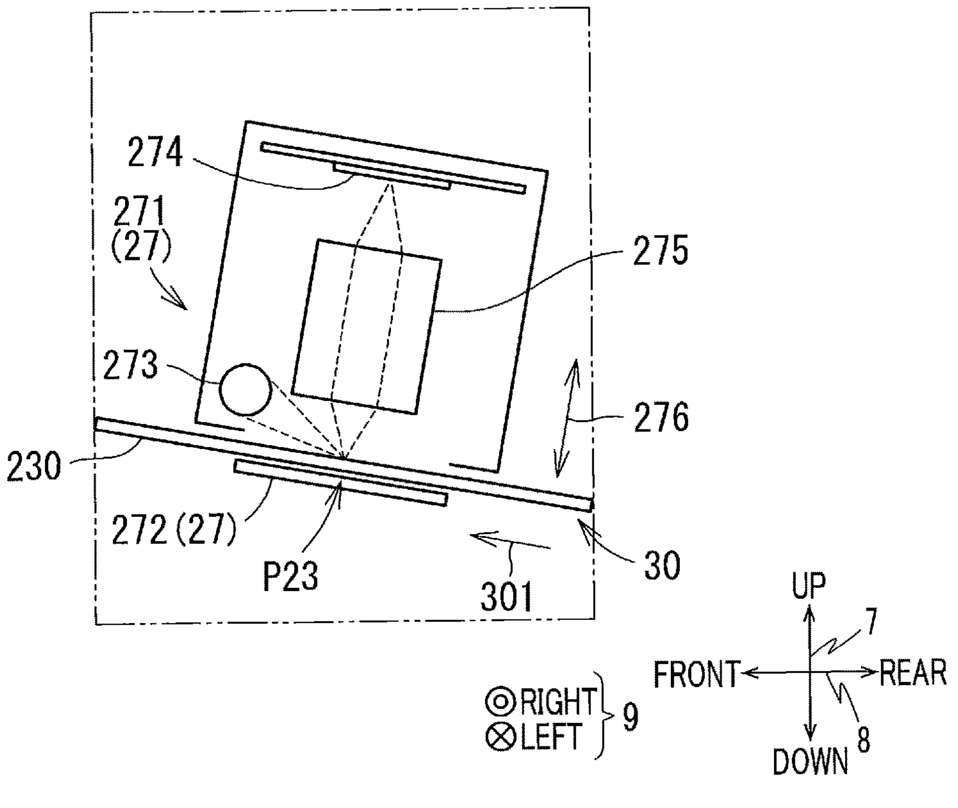
FIG. 3B is a schematic diagram illustrating a media reader.

As shown in FIG. 3B, the CIS 271 has a plurality of LEDs 273, a plurality of photodiodes 274, and a plurality of rod lenses 275. The LEDs 273, photodiodes 274, and rod lenses 275 differ from the LEDs 263, photodiodes 264, and rod lenses 265 in the following ways. The optical axis of each LED 273 passes through the media reading area P23. Each photodiode 274 is separated from the media reading area P23 in a separating direction 276. The separating direction 276 is the direction of the normal to the media conveying path 30 at the media reading area P23. The rod lenses 275 are positioned between the media reading area P23 and the photodiodes 274. The optical axis for each of the photodiodes 274 and rod lenses 275 extends in the separating direction 276.

Rotary Encoders 31 and 32

Figure 4A:
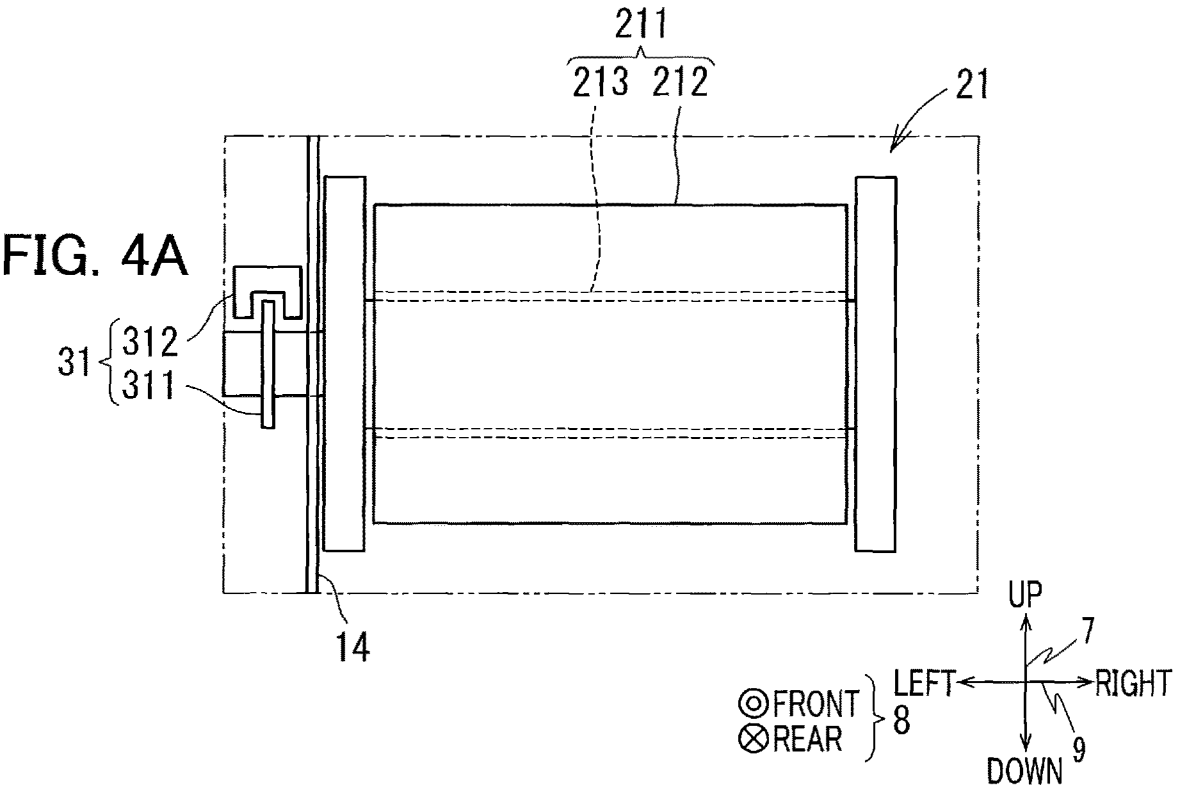
FIGS. 4A and 4B are schematic diagram illustrating rotary encoders.
Figure 4B:
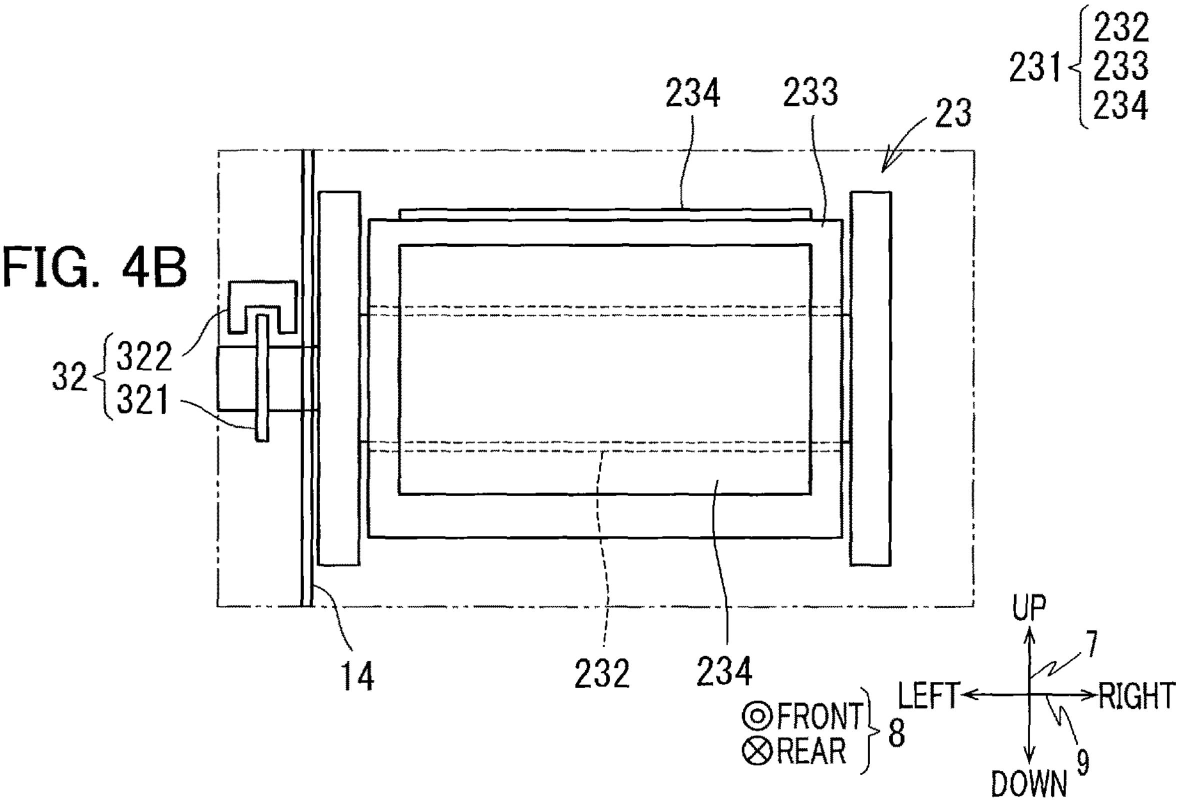

As shown in FIGS. 4A and 4B, the printer 100 is provided with rotary encoders 31 and 32. The rotary encoders 31 and 32 are disposed in the left space 110 of the printer 100 and are mounted on the left end of the ribbon supply member 21 and the left end of the media supply member 23, respectively. The rotary encoder 31 includes a disc 311 and a photointerrupter 312. The disc 311 rotates coaxially with the rotational axis of the ribbon supply member 21. A scale formed of translucent parts and opaque parts is formed on the disc 311 to indicate an angle or rotation amount in the circumferential direction of the axis of rotation. The photointerrupter 312 optically reads the scale markings and outputs a pulse signal (hereinafter called a "ribbon pulse signal") indicating the reading results.

The rotary encoder 32 includes a disc 321 and a photointerrupter 322. The disc 321 has similar scale markings to the disc 311 and rotates coaxially with the media supply member 23. The photointerrupter 322 similar to the photointerrupter 312 optically reads the scale markings on the disc 321 and outputting a pulse signal (hereinafter called a "media pulse signal") indicating the reading results. Note that the rectangular borders 236 (see FIG. 2B) have been omitted from the drawing in FIG. 4B.

Motors and Controller 36

Figure 5:
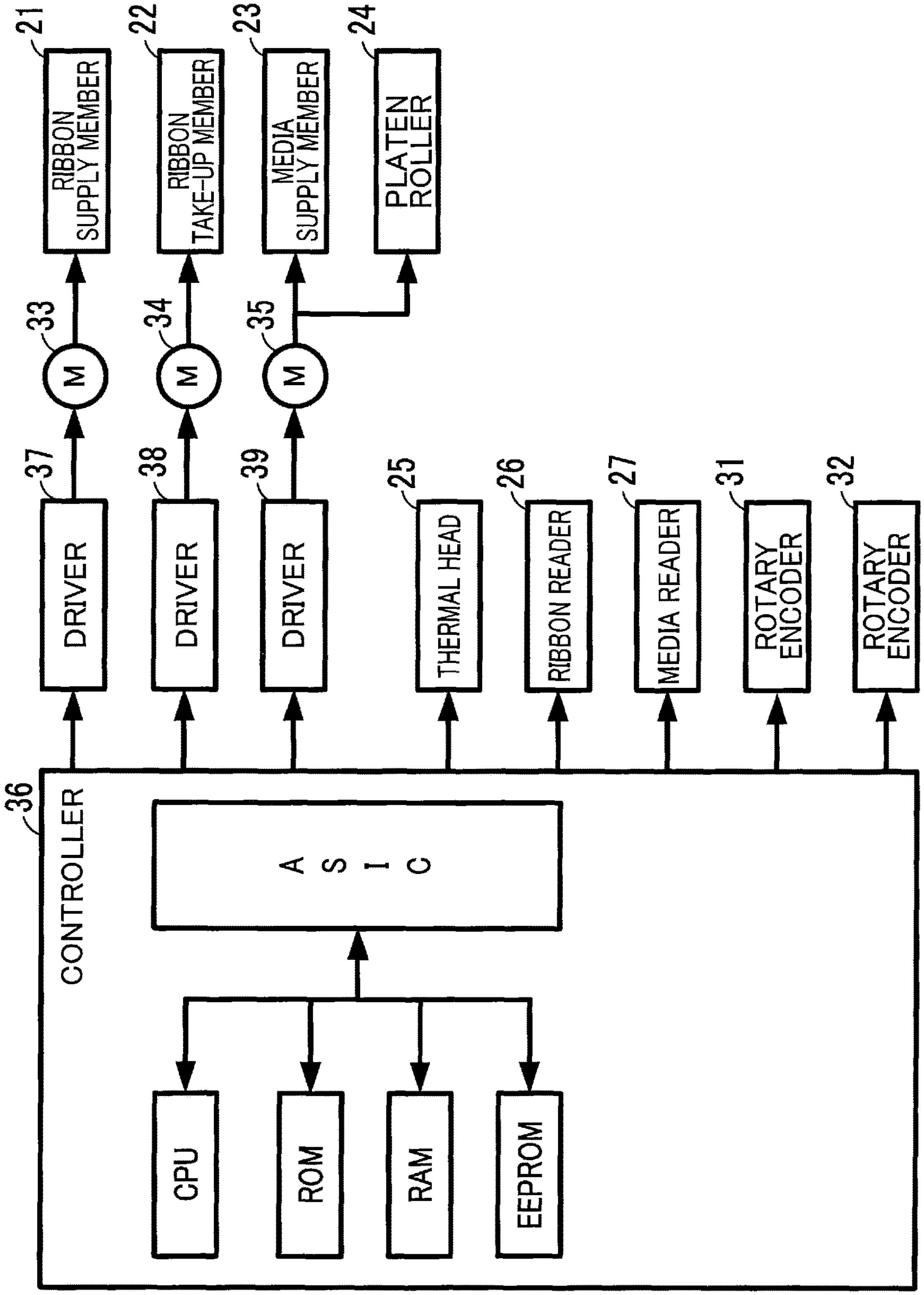
FIG. 5 is a block diagram illustrating the printer.

As shown in FIG. 5, the printer 100 is provided with a ribbon feed motor 33, a ribbon take-up motor 34, a media conveying motor 35, a controller 36, and drivers 37, 38, and 39.

The ribbon feed motor 33 and the ribbon take-up motor 34 are DC motors, for example, that generate a drive force for rotating the corresponding ribbon supply member 21 and ribbon take-up member 22. The media conveying motor 35 is a DC motor, for example, that generates a drive force for rotating the media supply member 23 and the platen roller 24.

The controller 36 has a central processing unit (CPU), a read only memory (ROM), a random access memory (RAM), an (electrically erasable programmable read-only memory) EEPROM, and an application specific integrated circuit (ASIC). The CPU executes a control program stored in ROM while using the RAM as a work area. In an image recording process shown in FIGS. 6 and 7, the controller 36 generates control signals for rotating the ribbon feed motor 33, the ribbon take-up motor 34, and the media conveying motor 35 and transmits these control signals to the drivers 37, 38, and 39.

Operations of the Printer 100

Next, the operations of the printer 100 will be described. As shown in FIG. 1B, the user of the printer 100 mounts the ribbon roll 211 and media roll 231 over the corresponding ribbon supply member 21 and media supply member 23. The user then passes the end of the ink ribbon 212 through the ribbon conveying path 29 and the end of the medium 230 through the media conveying path 30.

The printer 100 waits until image data is received from a PC or the like. In this example, the image data represents a monochrome image of a barcode having a substantially rectangular outline. The printer 100 records the monochrome image within the rectangular border 236 (see FIG. 2B). The image data includes a gradation value for each pixel position. A pixel position is specified by a coordinate value in the media conveying direction 301 and a coordinate value in the left/right directions 9. The coordinate value in the media conveying direction 301 is "0" at the leading edge of the label 234, and the coordinate value in the left/right directions 9 is "0" at the reference position.

Figure 6:
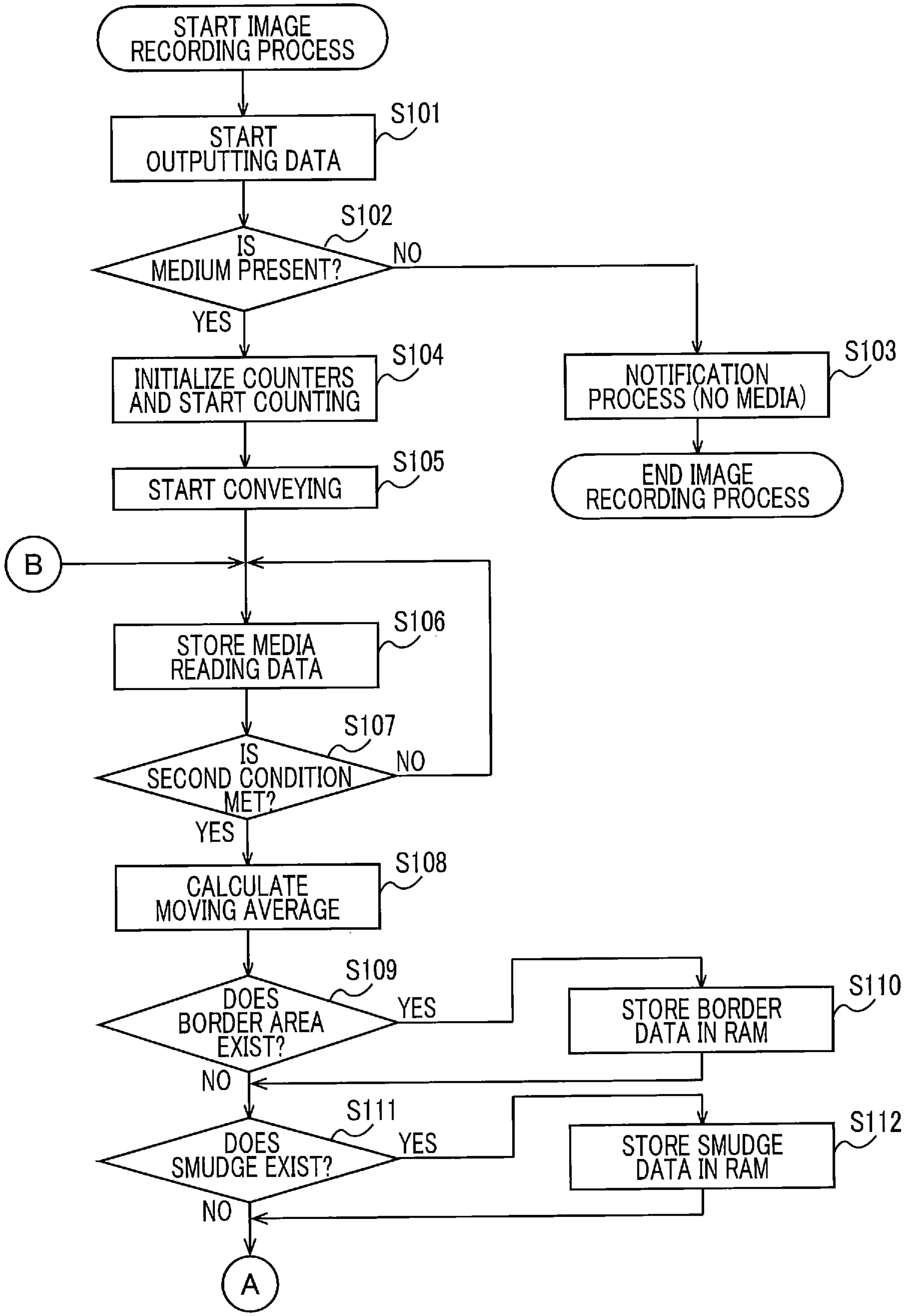
FIG. 6 is a flowchart illustrating a first half of an image recording process.

The controller 36 begins executing the image recording process shown in FIG. 6 when image data is received. In S101 of FIG. 6, the ribbon reader 26 and the media reader 27 begin periodically outputting ribbon reading data (an example of the first reading data) and media reading data (an example of the second reading data). The rotary encoders 31 and 32 begin outputting a ribbon pulse signal and a media pulse signal.

As shown in FIG. 3A, the LEDs 263 in the ribbon reader 26 emit linear light of a predetermined light intensity toward the ribbon reading area P22. That is, the LEDs 263 configure a linear light source that emits light of a predetermined light intensity toward the ribbon reading area P22. In other words, the LEDs 263 are arranged in a linear array so as to produce a line of light (linear light) extending in the left/right directions 9. The light is reflected by the reflecting member 262, passes through the rod lenses 265, and is incident on the photodiodes 264. The photodiodes 264 periodically output data indicating the intensity of their respective incident light (i.e., the intensity of light reflected by the reflecting member 262). The CIS 261 sequentially transmits data from each of the photodiodes 264 to the controller 36 as the ribbon reading data. The media reader 27 (see FIG. 3B) transmits media reading data to the controller 36 through operations similar to those of the ribbon reader 26.

In S102 of FIG. 6, the controller 36 uses a sensor (not shown) provided on the media supply member 23 and/or a leading edge sensor (not shown) provided downstream of the media supply member 23 to determine whether the medium 230 is present. When the medium 230 is not detected, the controller 36 assumes the medium 230 is not present on the media conveying path 30 (S102: NO) and advances to S103. When the controller 36 determines that the medium 230 is present (S102: YES), the controller 36 advances to S104.

In S103 the controller 36 executes a process to notify the user that there is no media. In this notification process, the controller 36 displays a message on a display (not shown) prompting the user to thread the medium 230 along the media conveying path 30. Alternatively, an audio message of the same content may be outputted through a speaker (not shown). After completing the notification in S103, the controller 36 ends the image recording process.

In S104 the controller 36 initializes a media encoder value and a ribbon encoder value and begins counting the media encoder value and ribbon encoder value. Here, the media encoder value and ribbon encoder value denote the number of pulses counted in the respective media pulse signal and ribbon pulse signal.

In S105 the controller 36 begins to rotate the media supply member 23, the platen roller 24, the ribbon supply member 21, and ribbon take-up member 22 through control signals. As a result, the medium 230 is conveyed downstream along the media conveying path 30 at a constant speed, and the ink ribbon 212 is conveyed downstream along the ribbon conveying path 29 at the same speed as the medium 230.

Figure 8:
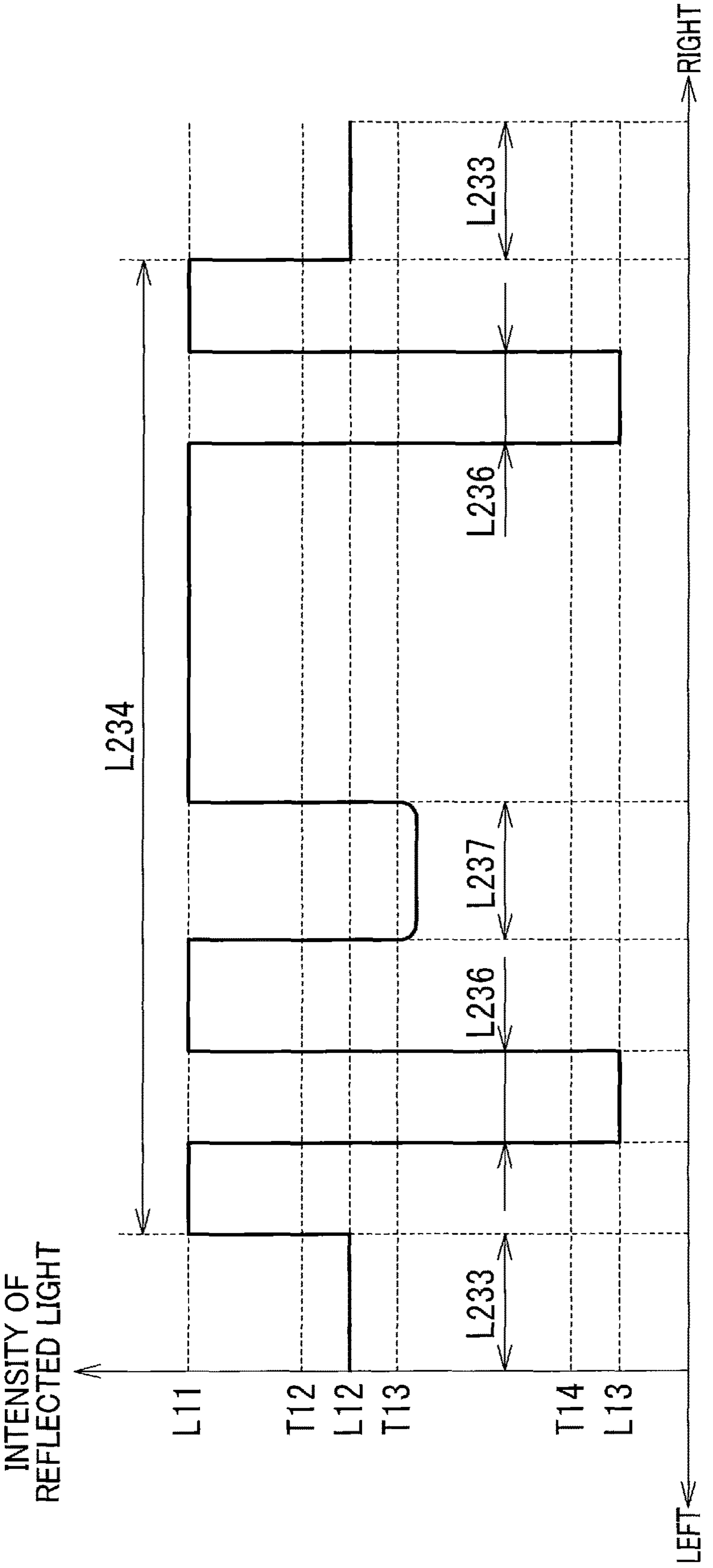
FIG. 8 is a graph illustrating a relationship between an intensity of light and threshold values.

After initiating this conveyance in S105, the controller 36 waits until the light intensity specified in the media reading data for the two most recent lines satisfies a first condition before advancing to S106. In FIG. 8, the vertical axis indicates the intensity of light incident on the photodiode 274 and the horizontal axis indicates the position of the photodiode 274 in the left/right directions 9. In FIG. 8, L11 represents the intensity of light incident on each photodiode 274 when the light is reflected off the white portion of a label 234. L12 represents the intensity of light incident on each photodiode 274 when the light is reflected off the backing paper 233, for example. In FIG. 8, the intensity of light reflected off the backing paper 233 is illustrated in segments L233 with respect to the left/right directions 9, while the intensity of light reflected off the white portion of the label 234 is illustrated in a segment L234 with respect to the left/right directions 9. The light intensities L11 and L12 are experimental values. The first condition is that the leading edge of the label 234 is in the media reading area P23. Specifically, the first condition is satisfied when the light intensity indicated by the most recent media reading data is larger than or equal to a threshold value T12, and the light intensity indicated by the media reading data immediately preceding this most recent data is below the threshold value T12. More specifically, the first condition is satisfied when there exists at least one light intensity indicated by the most recent media reading data that is larger than or equal to a threshold value T12, and the light intensities indicated by the media reading data immediately preceding this most recent data are all below the threshold value T12. The first condition may be satisfied when there exist at least a predetermined first number of light intensities indicated by the most recent media reading data each being larger than or equal to the threshold value T12, and there exist at least a predetermined second number of light intensities indicated by the media reading data immediately preceding this most recent data that are all below the threshold value T12. In this case, the first number may be smaller than the second number. The threshold value T12 is a value near the light intensity L12 in the range between the light intensities L11 and L12 (see FIG. 8). In other words, the light intensity L12 is closer to the threshold value T12 than the light intensity L111 to the threshold value T12.

In S106 the controller 36 stores the media reading data received from the media reader 27 in RAM for processing.

In S107 the controller 36 determines whether the light intensities indicated by the media reading data for the most recent two lines satisfy a second condition. The second condition is that the trailing edge of the label 234 is in the media reading area P23. Specifically, the second condition is satisfied when the intensity indicated in the most recent media reading data is below the threshold value T12 (see FIG. 8), and the light intensity indicated in the media reading data just prior to the most recent data is greater than or equal to the threshold value T12. More specifically, the second condition is satisfied when the intensities indicated in the most recent media reading data are all below the threshold value T12 (see FIG. 8), and there exists at least one light intensity indicated in the media reading data just prior to the most recent data that is greater than or equal to the threshold value T12. The second condition may be satisfied when there exist at least the second number of intensities indicated in the most recent media reading data each being below the threshold value T12 (see FIG. 8), and there exists at least the first number of intensities indicated in the media reading data just prior to the most recent data each being greater than or equal to the threshold value T12. The controller 36 advances to S108 when determining that the second condition is satisfied (S107: YES) and returns to S106 when determining that the second condition is not satisfied (S107: NO).

Thus, once the controller 36 has advanced to S108, media reading data read for one label 234 is stored in RAM.

In S108 the controller 36 finds the moving average in the left/right directions 9 for each light intensity value included in the media reading data stored in RAM. Subsequently, the controller 36 selects a moving average less than or equal to a threshold value T14. As shown in FIG. 8, when light is reflected off the rectangular border 236 of a label 234, the intensity of light incident on the label 234 is a light intensity L13, which is smaller than the light intensity L12. The light intensity L13 is nearly zero. In FIG. 8, the intensity of light reflected off the rectangular border 236 is illustrated in segments L236 in the left/right directions 9. The threshold value T14 is slightly larger than the light intensity L13.

In S109 the controller 36 determines the existence of an area having a prescribed number of contiguous pixels in the left/right directions 9 whose moving average is no greater than the threshold value T14 (hereinafter called a "border area"). The controller 36 advances to S110 when determining that a border area is present (S109: YES) and advances to S110 when determining that a border area is not present (S109: NO).

In S110 the controller 36 stores positions for the group of pixels determined in S109 to be a border area in RAM as border data and subsequently advances to S111.

FIG. 8 shows a segment L237 that corresponds to a smudge present on the label 234. Since the color of the smudge is lighter than that of the rectangular border 236, light reflected off the smudge and incident on the photodiodes 274 is lower than the light intensity L12 but higher than the light intensity L13. In FIG. 8, the intensity of light reflected off the smudge is illustrated by the segment L237 in the left/right directions 9.

In S111 the controller 36 determines whether a smudged area is present. The presence of a smudged area satisfies the condition that a prescribed number of contiguous pixels in the left/right directions 9 have a moving average greater than the threshold value T14 and less than a threshold value T13. The threshold value T13 is slightly smaller than the light intensity L12. When the controller 36 determines that a smudged area exists (S11: YES), the controller 36 advances to S112.

In S112 the controller 36 stores the positions of the group of pixels in the smudged area in RAM as smudge data.

After completing the process of S112 or when determining in S111 that a smudged area does not exist (S111: NO), the controller 36 determines whether a third condition is satisfied. The controller 36 advances to S113 in FIG. 7 once it has been determined that the third condition is satisfied. The third condition is a condition required to start recording of a monochrome image. Specifically, the controller 36 first finds the current diameter of the media roll 231 using a known method. Next, the controller 36 finds the distance that the label 234 has been conveyed along the media conveying path 30 based on the current media encoder value and the current diameter of the media roll 231. The controller 36 acquires the smallest coordinate value in the media conveying direction 301 from among all positions of pixels constituting the image data as the distance between the leading edge of the label 234 and the leading edge of the monochrome image. The controller 36 determines that the third condition is satisfied when the conveying distance of the label 234 after the leading edge of the label 234 reached the printing area P21 matches the distance between the leading edge of the label 234 and the leading edge of the monochrome image.

In S113 the controller 36 selects heating elements of the thermal head 25 based on the image data and heats the selected heating elements, causing ink to be transferred to the label 234 from the ink layer 215 of the ink ribbon 212. As a result, a monochrome image (an example of the first image) is recorded on the label 234. At the same time, an image in which black and white colors are reversed from the monochrome image (hereinafter called a "reverse image") is formed on the ink ribbon 212.

After executing the process in S113, the controller 36 determines whether a fourth condition is met. The controller 36 advances to S114 once the fourth condition has been met. The fourth condition is that the conveying distance of the ink ribbon 212 after the leading edge of the label 234 reached the printing area P21 matches an inter-area distance. The inter-area distance is the distance along the ribbon conveying path 29 from the printing area P21 to the ribbon reading area P22. Specifically, the controller 36 finds the current diameter of the ribbon roll 211 and subsequently finds the conveying distance of the ink ribbon 212 based on the current ribbon encoder value and the current diameter of the ribbon roll 211. In other words, the fourth condition is that a leading edge of the reverse image on the ink ribbon 212 reaches the ribbon reading area P22.

In S114 the controller 36 stores the ribbon reading data received from the ribbon reader 26 in RAM for processing.

After completing the process in S114, the controller 36 determines whether a fifth condition is met. The controller 36 advances to S115 once the fifth condition has been met. The fifth condition is that the ink ribbon 212 has been conveyed a distance equivalent to the dimension of the label 234 in the media conveying direction 301 following the execution of S114. In other words, the fifth condition is that a trailing edge of the reverse image on the ink ribbon 212 reaches the ribbon reading area P22.

At the time the controller 36 advances to S115, the RAM stores ribbon reading data obtained by reading the reverse image corresponding to a single label 234.

In S115 through S123 described below, the controller 36 determines the condition of the monochrome image recorded on the label 234 based on the ribbon reading data and/or media reading data stored in RAM.

In S115 the controller 36 detects the pixel positions of feature points in the reverse image from the ribbon reading data in RAM. The feature points are the four vertices of the substantially rectangular reverse image.

In S116 the controller 36 identifies the light intensity at positions in the image surrounded by the four feature points based on the ribbon reading data stored in RAM. The controller 36 further converts each identified light intensity to a gradation value, and stores the gradation value in RAM. More specifically, light intensities greater than or equal to a predetermined reference value are converted to the black gradation value while light intensities less than the reference level are converted to the white gradation value.

In S117 the controller 36 compares the gradation value in the ribbon reading data in RAM to the gradation value of the image data for each pixel position to determine whether the monochrome image recorded on the label 234 has any defects (missing dots). The controller 36 advances to S118 when determining that no defects were produced (S117: NO) and advances to S121 when determining that defects were produced (S117: YES).

In S118 the controller 36 determines whether any of the pixel positions surrounded by the four feature points in the ribbon reading data stored in RAM overlaps a pixel position of pixels in border data or smudge data. The controller 36 advances to S119 when determining that there is no overlap among such pixel positions (S118: NO) and advances to S122 when determining that there is overlap (S118: YES).

The difference in light intensity between any two neighboring pixels in the reverse image is either 0 or the light intensity L11 as long as there are no wrinkles (creases) in the ink ribbon 212 present on the ribbon conveying path 29. In a wrinkled area, on the other hand, the difference in light intensity between two neighboring pixels in the reverse image will be greater than 0 and less than the maximum value.

In S119 the controller 36 determines whether the difference in light intensity between adjacent pixel positions is within a light intensity range from a light intensity lower limit L21 to a light intensity upper limit L22 in the ribbon reading data stored in RAM. The light intensity lower limit L21 is a value slightly larger than 0, while the light intensity upper limit L22 is a value slightly smaller than the light intensity L11. When the controller 36 determines that no light intensity differences fall within this light intensity range (S119: NO), the controller 36 determines that the monochrome image on the label 234 is in good condition. In this case, in S120 the controller 36 determines whether there are other monochrome images to record. When the controller 36 has more monochrome images to record (S120: YES), the controller 36 continues the image recording process from S106 described above. However, when there are no more monochrome images to record (S120: NO), the controller 36 ends the image recording process. Once the image recording process has ended, the user manually tears off the medium 230 with the labels 234 that has been discharged through the discharge opening 121 of the housing 1. On the other hand, when the controller 36 determines in S119 that there is a difference in light intensity that fall within the light intensity range (S119: YES), the controller 36 advances to S123.

In S121, S122, and S123, the controller 36 executes corresponding notification processes to notify the user of defects in the monochrome image, overlap between the image and a border or smudge, and wrinkles in the ink ribbon, respectively. In the process to notify the user of defects in S121, the controller 36 outputs through a display, speaker (not shown), or the like a message specifying that the monochrome image recorded on the label 234 has defects. In the process to notify the user of border/smudge overlap in S122, the controller 36 outputs through the display, speaker, or the like a message specifying that the monochrome image recorded on the label 234 overlaps the rectangular border 236 or a smudge. In the process to notify the user of wrinkles in S123, the controller 36 outputs through a display, speaker, or the like a message specifying that a wrinkle is present in the ink ribbon 212.

Operations and Effects of the Embodiment

In the printer 100 of the embodiment described above, the thermal head 25 transfers ink to a label 234. Consequently, the ink ribbon 212 having passed through the printing area P21 has a reverse image formed in the same shape as the monochrome image that was recorded on the label 234. The ribbon reader 26 transmits ribbon reading data to the controller 36 based on the reverse image formed on the ink ribbon 212. By determining the condition of the reverse image formed on the ink ribbon with the ribbon reader 26, the printer 100 can determine the quality of label 234. Since the ribbon reader 26 is mounted inside the housing 1, this arrangement avoids an increase in the size of the printer 100.

The ink ribbon 212 has the ink layer 215 carried on the base layer 214 (FIG. 2A). The ink ribbon 212 passes through the gap between the CIS 261 and the reflecting member 262. At this time, the ink layer 215 faces the reflecting member 262. Therefore, the CIS 261 does not become stained by ink since the ink layer 215 does not contact the CIS 261.

Figure 7:
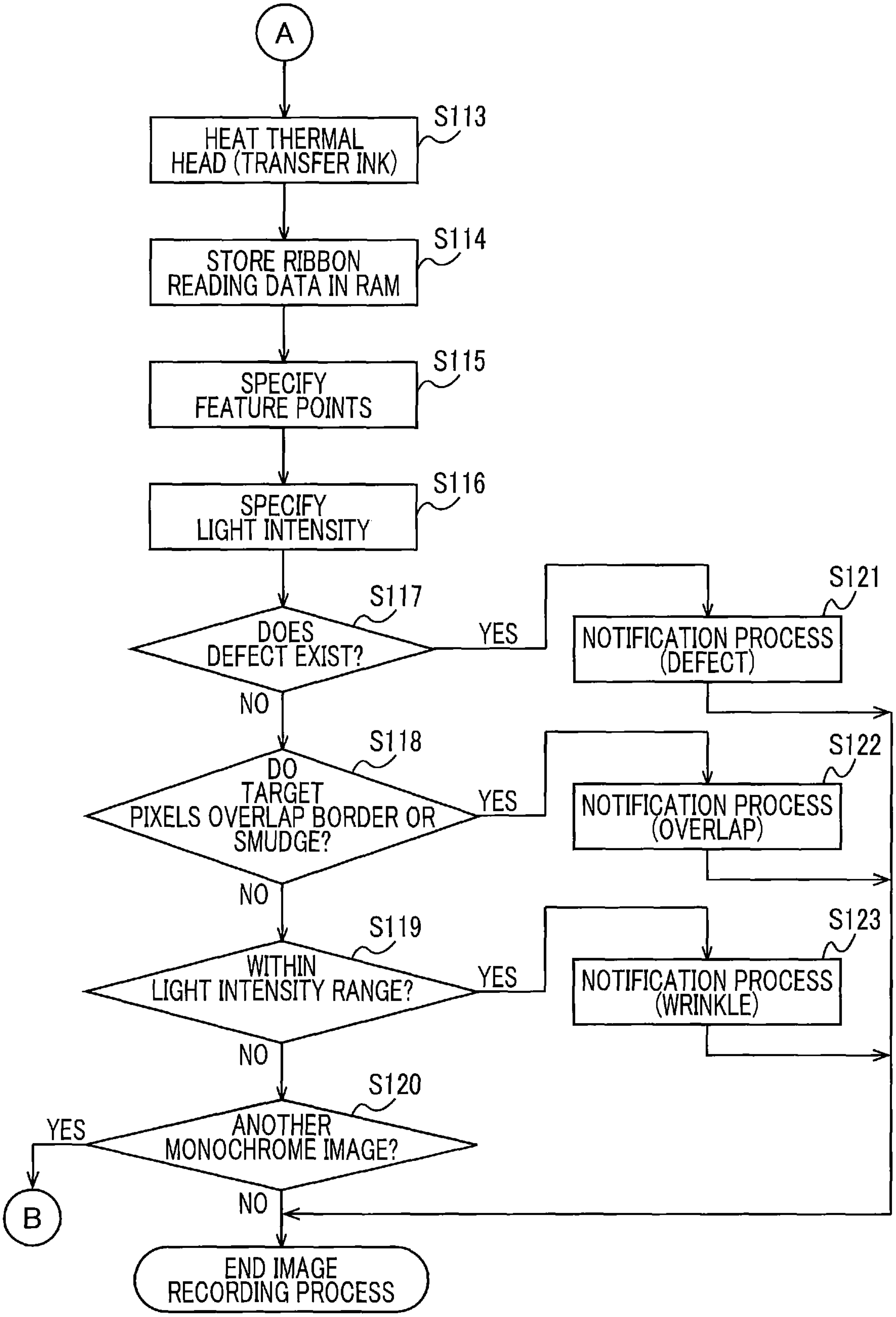
FIG. 7 is a flowchart illustrating a second half of the image recording process.

From S115 in the image recording process of FIGS. 6 and 7, the printer 100 determines the quality or condition of the monochrome image recorded on the label 234, thereby ensuring the output of high-quality printed matter.

VARIATIONS OF THE EMBODIMENT

Figure 9A:
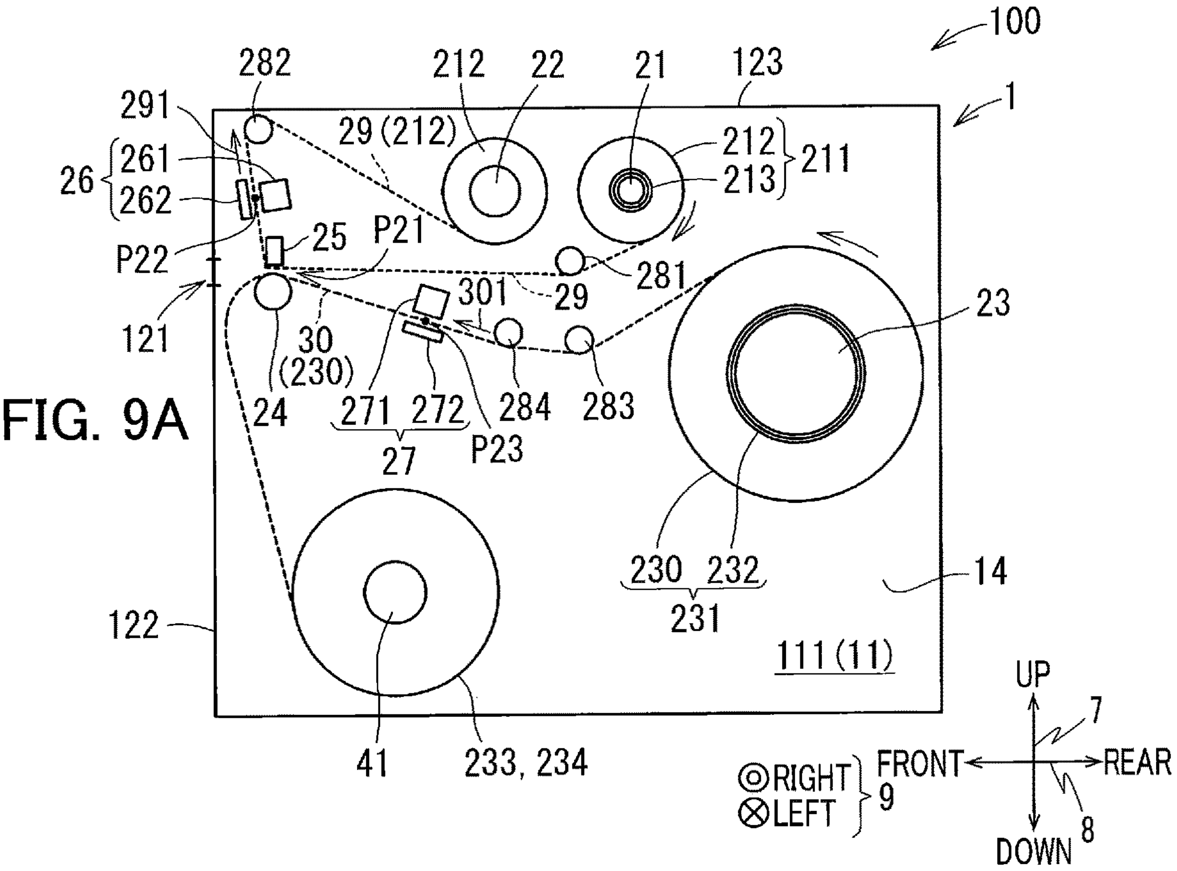
FIGS. 9A and 9B are schematic diagrams illustrating interior structures of printers.

As shown in FIG. 9A, in addition to the structure of the printer 100 in FIG. 1A, a media take-up member 41 (an example of the second take-up member) may be added to the right space 111. The media take-up member 41 is positioned below the platen roller 24 and the media reader 27 and forward of the media supply member 23. The media take-up member 41 is rotated with a drive force generated by the media conveying motor 35 and takes up printed matter at a position on a media conveying path 30 downstream of the printing area P21. The printed matter is the backing paper 233 having an array of labels 234 on which images have been recorded. Note that the media take-up member 41 can be detached from the housing 1.

Figure 9B:
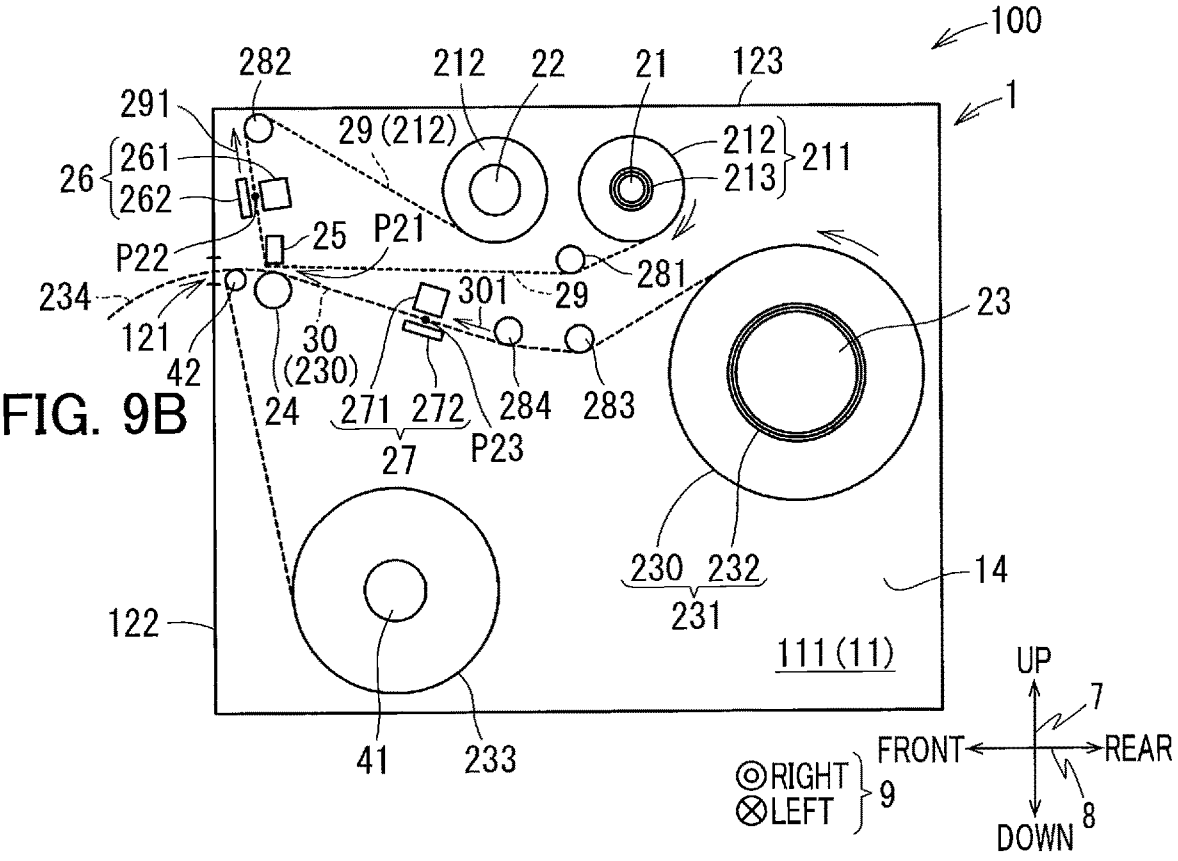

As shown in FIG. 9B, in addition to the structure of the printer 100 shown in FIG. 9A, the printer 100 may be further provided with a separating member 42. The separating member 42 is disposed at a separating position along a media conveying path 30 between the printing area P21 and the discharge opening 121 for separating labels 234 from the backing paper 233 as the backing paper 233 is conveyed downstream from the printing area P21. The labels 234 are discharged through the discharge opening 121, while the backing paper 233 is conveyed to the media take-up member 41. Note that the separating member 42 can be detached from the housing 1.

According to the above structures shown in FIGS. 9A and 9B, the ribbon reader 26 reads a reverse image formed on the ink ribbon 212 as the ink ribbon 212 is conveyed along the ribbon conveying path 29 and uses data read from this image to determine the quality of the printed matter. In other words, the ribbon reader 26 does not read the monochrome image at a position on the media conveying path 30 downstream from the printing area P21. Accordingly, the section of the media conveying path 30 downstream of the printing area P21 is not made more complex in a case that the structures include the media take-up member 41 and/or the separating member 42.

OTHER VARIATIONS

In the embodiment described above, the ribbon supply member 21 is rotated by a drive force from the ribbon feed motor 33, whereby the ink ribbon 212 is paid off the ribbon supply member 21 and supplied onto the ribbon conveying path 29. However, the drive force of a motor need not be transmitted to the ribbon supply member 21. In this case, the ribbon take-up member 22 is rotated to draw the ink ribbon 212 off the ribbon supply member 21 and supply the ink ribbon 212 onto the ribbon conveying path 29. In other words, the ink ribbon 212 may be supplied onto the ribbon conveying path 29 either by being paid off the ribbon supply member 21 or by being drawn off the ribbon supply member 21 by the ribbon take-up member 22.

In the embodiment described above, the ribbon reader 26 and the media reader 27 are respectively provided with the CIS 261 and the CIS 271 (see FIG. 3). The CIS 261 and the CIS 271 are reflective photosensors in the embodiment. However, the ribbon reader 26 and the media reader 27 may be provided with transmissive photosensors instead. In this case, the ribbon reader 26 and the media reader 27 need not be provided with the reflecting members 262 and 272.

In the embodiment, the ribbon reading data is a collection of data specifying the intensity of light incident on each photodiode 264. However, in a case that the ribbon reader 26 is provided with an image processing IC, this image processing IC may generate image data representing the reverse image based on data received from the photodiodes 264 and may transmit this image data to the controller 36 as the ribbon reading data. The same configuration may be employed for the media reading data.

In the image recording process of the embodiment (FIGS. 6 and 7), border data is stored in RAM when a border area is present (S109-S110) and smudge data is stored in RAM when a smudge is present (S111 and S112). However, the controller 36 may execute just one of the processes in S109-S110 and S111-S112 rather than both.

The CIS 261 in the embodiment is provided with a plurality of LEDs 263 as the light source. However, the light source may be configured of a halogen lamp that is elongated in the left/right directions 9. Alternatively, the light source may be at least a single LED, and a light guide that extends in the left/right directions 9. These configurations may also be employed for the CIS 271.

The media roll 231 in the embodiment is a roll of die-cut labels. However, the media roll 231 may have a label formed as a continuous sheet rather than the plurality of labels 234. The media roll 231 may also be coreless, i.e., without the core tube 232. The media roll 231 may also be a continuous sheet of paper such as that used for receipts.

The printer 100 in the embodiment records images on the media roll 231. However, the printer 100 may also record images on fan-fold paper.

Figure 10:
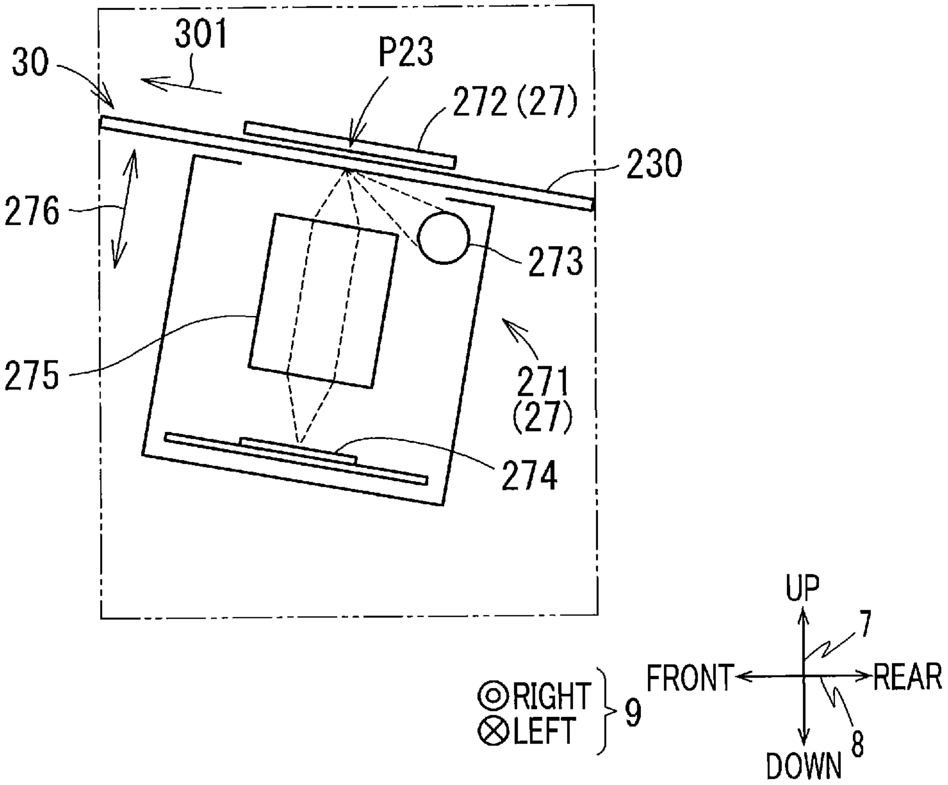
FIG. 10 is a schematic diagram illustrating a media reader.

As shown in FIG. 3B, the CIS 271 in the embodiment is positioned directly above the media reading area P23, and the reference member 272 is positioned directly below the media reading area P23. However, the CIS 271 may conversely be positioned directly below the media reading area P23 while the reference member 272 is positioned directly above the media reading area P23, as illustrated in FIG. 10. In this case, the CIS 271 will not be stained by ink since it is less likely that the CIS 271 contacts the ink layer 215 of the ink ribbon 212.

In S105 of the embodiment, the ink ribbon 212 and the medium 230 are conveyed synchronously. However, conveyance of the ink ribbon 212 may be limited to the time that ink is being transferred onto a label 234 in S114. In this case, the controller 36 must store media reading data read from a single label 234 and ribbon reading data read from the single reverse image corresponding to the label 234 in RAM based on the media encoder value and the ribbon encoder value.

In S105 of the embodiment, the medium 230 is conveyed at a constant speed. Specifically, the printer 100 executes continuous printing on a plurality of labels 234 in S113 while conveying the medium 230 at a constant speed. However, the controller 36 may instead repeatedly and intermittently convey the medium 230 first in the media conveying direction 301 (i.e., a "forward feed") and then in the direction opposite the media conveying direction 301 (i.e., a "reverse feed"). In this case, the controller 36 can sequentially print on a plurality of labels 234 one at a time, for example. The term "conveyance" in S105 includes this meaning of intermittent conveyance with repeated forward and reverse feeds.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. An image recording device comprising:

a housing;

a thermal head located in the housing;

a first supply member from which an ink ribbon is to be supplied toward the thermal head, the first supply member being located in the housing, the ink ribbon including an ink layer;

a first take-up member located in the housing and configured to take up the ink ribbon;

a conveying member located in the housing and configured to convey a medium toward the thermal head;

a platen located in the housing and facing the thermal head, the platen and the thermal head being configured to sandwich both the ink ribbon and the medium at a nip position in a first direction in which the ink ribbon is conveyed;

a first reader located in the housing and configured to optically read a first target portion of the ink ribbon which is positioned at a first reading position downstream of the nip position in the first direction so that a quality or condition of an image recorded on the medium can be determined;

a second reader configured to optically read a second target portion of the medium which is positioned at a second reading position upstream of the nip position in a second direction in which the medium is conveyed; and a computer configured to perform:

determining a positional relation between a first image formed on the medium and a second image prerecorded on the medium by using first reading data and second reading data, the first image being formed by ink transferred from the ink layer to the medium, the first reading data being based on a result of reading the first target portion of the ink ribbon by the first reader, the second reading data being based on a result of reading the second target portion of the medium by the second reader.

2. The image recording device according to claim 1, wherein the ink ribbon further includes a base material supporting the ink layer, the base material being translucent, wherein the first reader includes:

a light emitting element configured to face the base material of the first target portion which is positioned at the first reading position;

a light receiving element configured to face the base material of the first target portion which is positioned at the first reading position; and a reflecting member configured to face the ink layer of the first target portion which is positioned at the first reading position.

3. The image recording device according to claim 1, wherein the computer is configured to further perform:

evaluating a condition of the medium by using reading data based on a result of reading the second target portion of the medium by the second reader.

4. The image recording device according to claim 1, wherein a first conveying path and a second conveying path are defined in an interior space of the housing, wherein the interior space of the housing includes a first space and a second space, the second conveying path being in between the first space and the second space, wherein the ink ribbon is conveyed along the first conveying path and the medium is conveyed along the second conveying path, wherein the second reader includes:

a light emitting element;

a light receiving element; and a reflecting member, wherein the first supply member, the first conveying path, and the reflecting member are located in the first space, and the light emitting element and the light receiving element are located in the second space.

5. The image recording device according to claim 1, wherein the housing is formed with a discharge opening, wherein the conveying member is configured to discharge the medium from the discharge opening.

6. The image recording device according to claim 1, further comprising a second take-up member configured to take up the medium at a position located downstream of the nip position in the second direction in which the medium is conveyed.

7. The image recording device according to claim 1, wherein the medium includes a base material which is a continuous material elongated in a longitudinal direction, and a plurality of target materials arranged on the base material in the longitudinal direction, ink being to be transferred onto each of the plurality of target materials, the image recording device further comprising:

a separating member configured to separate each of the plurality of target materials from the base material at a separation position located downstream of the nip position in the second direction in which the medium is conveyed; and a second take-up member located in the housing and configured to take up the base material at a downstream position of the separation position in the second direction.

8. A method comprising:

transferring, using a thermal head, ink to selected areas on a medium from an ink layer provided in an ink ribbon to record an image on the medium;

generating first reading data by optically reading a used portion of the ink ribbon by using a first reader, the used portion being a portion that has been used to record the image on the medium in the transferring;

evaluating a condition of the image recorded on the medium by using the first reading data;

generating second reading data by optically reading a portion of the medium, on which the transferring ink is not performed yet, by using a second reader; and determining a positional relation between a first image formed on the medium and a second image prerecorded on the medium by using the first reading data and the second reading data, the first image being formed by the transferring.

9. The method according to claim 8, further comprising:

evaluating a condition of the medium by using the second reading data.

* * * * *